(12) United States Patent
Chen et al.

(10) Patent No.: US 10,119,076 B2
(45) Date of Patent: Nov. 6, 2018

(54) GASIFIER AND METHOD OF USING THE SAME FOR GASIFICATION OF BIOMASS AND SOLID WASTE

(71) Applicant: WUHAN KAIDI GENERAL RESEARCH INSTITUTE OF ENGINEERING & TECHNOLOGY CO., LTD., Wuhan (CN)

(72) Inventors: Yilong Chen, Wuhan (CN); Yanfeng Zhang, Wuhan (CN); Minggui Xia, Wuhan (CN); Liang Zhang, Wuhan (CN)

(73) Assignee: WUHAN KAIDI GENERAL RESEARCH INSTITUTE OF ENGINEERING & TECHNOLOGY CO., LTD., Wuhan (CN)

( * ) Notice: Subject to any disclaimer, the term of this patent is extended or adjusted under 35 U.S.C. 154(b) by 880 days.

(21) Appl. No.: 14/315,304

(22) Filed: Jun. 25, 2014

(65) Prior Publication Data

US 2014/0305784 A1    Oct. 16, 2014

Related U.S. Application Data

(63) Continuation-in-part of application No. PCT/CN2012/083566, filed on Oct. 26, 2012.

(30) Foreign Application Priority Data

Dec. 29, 2011    (CN) .......................... 2011 1 0449489

(51) Int. Cl.
   *C10B 47/00*    (2006.01)
   *C10B 21/10*    (2006.01)
   (Continued)

(52) U.S. Cl.
   CPC ............... *C10B 21/10* (2013.01); *C01B 3/26* (2013.01); *C10J 3/18* (2013.01); *C10J 3/84* (2013.01);
   (Continued)

(58) Field of Classification Search
   CPC .......... C10J 2300/1238; C10J 2300/123; C10J 3/12; C10J 2300/0933; H05H 1/46; C01B 2203/0861
   See application file for complete search history.

(56) References Cited

U.S. PATENT DOCUMENTS 6,018,471 A *    1/2000    Titus ................... A62D 3/19
                                                363/126
6,388,225 B1 *   5/2002    Blum ................... H05H 1/46
                                                219/121.43
(Continued)

FOREIGN PATENT DOCUMENTS

CN          101906326 A *   12/2010    ............... C10J 3/12

OTHER PUBLICATIONS

Foreign Publication Document CN101906326A.*

*Primary Examiner* — Bobby Ramdhanie
*Assistant Examiner* — Briana M Obenhuber
(74) *Attorney, Agent, or Firm* — Matthias Scholl P.C.; Matthias Scholl

(57) ABSTRACT

A gasifier including a vertically disposed furnace body, a feeder disposed in a middle part of the furnace body and communicating with the furnace body, one or two layers of microwave plasma generators, an external heater configured to supply external thermal energy for the gasifier, and a monitoring unit. The furnace body includes an upper nozzle for spraying vapor, a lower nozzle for spraying $CO_2$/vapor, a syngas outlet disposed at a top of the furnace body. The upper nozzle for spraying vapor is disposed in a clearance (Continued)

zone of the furnace body, and the lower nozzle for spraying $CO_2$/vapor is disposed in a bed zone of the furnace body. The monitoring unit is disposed close to the syngas outlet. The one or two layers of microwave plasma generators are disposed above the upper nozzle in the clearance zone of the gasifier.

9 Claims, 2 Drawing Sheets

(51) Int. Cl.
    *C01B 3/26*    (2006.01)
    *C10J 3/18*    (2006.01)
    *C10J 3/84*    (2006.01)

(52) U.S. Cl.
    CPC ............ *C01B 2203/0277* (2013.01); *C01B 2203/0861* (2013.01); *C10J 2300/0916* (2013.01); *C10J 2300/0946* (2013.01); *C10J 2300/0969* (2013.01); *C10J 2300/0976* (2013.01); *C10J 2300/0993* (2013.01); *C10J 2300/1238* (2013.01); *C10J 2300/1246* (2013.01); *C10J 2300/1631* (2013.01); *C10J 2300/1637* (2013.01); *C10J 2300/1807* (2013.01); *Y02P 20/134* (2015.11); *Y02P 20/145* (2015.11)

(56) References Cited

U.S. PATENT DOCUMENTS

| | | | | |
|---|---|---|---|---|
| 2008/0277265 A1* | 11/2008 | Tsangaris | ............... | C10J 3/24 |
| | | | | 204/157.15 |
| 2009/0064581 A1* | 3/2009 | Nielsen | ............... | C10J 3/18 |
| | | | | 48/78 |
| 2013/0125465 A1* | 5/2013 | Tang | ............... | C10J 3/12 |
| | | | | 48/119 |

\* cited by examiner

US 10,119,076 B2

GASIFIER AND METHOD OF USING THE SAME FOR GASIFICATION OF BIOMASS AND SOLID WASTE

CROSS-REFERENCE TO RELATED APPLICATIONS

This application is a continuation-in-part of International Patent Application No. PCT/CN2012/083566 with an international filing date of Oct. 26, 2012, designating the U.S., now pending, and further claims priority benefits to Chinese Patent Application No. 201110449489.7 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention relates to the gasification of biomass and solid waste, and more particularly to a gasifier and method for gasifying biomass and solid waste to synthesize high quality syngas in the presence of external thermal energy and microwave plasma.

Description of the Related Art

Conventional fixed bed gasification of biomass has characteristics of a simple structure, flexible operation, long retention time of solid materials on the fixed bed, and high cracking efficiency. The biomass fuel on the fixed bed only requires primary crushing to have uniform particle sizes. However, the gasification temperature is low and nonuniform, the tar content is high, the active components in the syngas are few, and the gasification efficiency is low, all of which greatly limit the gasification of biomass.

SUMMARY OF THE INVENTION

In view of the above-described problems, it is one objective of the invention to provide an externally heated microwave plasma gasifier and a method of using the same for the gasification of biomass and solid waste to synthesize high quality syngas.

To achieve the above objective, in accordance with one embodiment of the invention, there is provided a gasifier, comprising a vertically disposed furnace body, a feeder disposed in a middle part of the furnace body and communicating with the furnace body, one or two layers of microwave plasma generators, an external heater configured to supply external thermal energy for the gasifier, and a monitoring unit. The furnace body comprises an upper nozzle for spraying vapor, a lower nozzle for spraying $CO_2$/vapor, a syngas outlet disposed at a top of the furnace body. The upper nozzle for spraying vapor is disposed in a clearance zone of the furnace body, and the lower nozzle for spraying $CO_2$/vapor is disposed in a bed zone of the furnace body; the monitoring unit is disposed close to the syngas outlet; the one or two layers of microwave plasma generators are disposed above the upper nozzle in the clearance zone of the gasifier; each layer of the microwave plasma generators comprises three or four working gas inlets, and plasma flow is sprayed into the clearance zone of the gasifier horizontally/tangentially; the external heater is integrated with the furnace body or is separated from the furnace body; and the external heater comprises a slag outlet for discharging slags.

In a class of this embodiment, a circulating material outlet is disposed at a bottom of the furnace body and a circulating material inlet is disposed at a top of the furnace body, or the circulating material outlet and the circulating material inlet are both disposed at a sidewall of the furnace body; the external heater is separated from the furnace body and is disposed between the circulating material outlet and the circulating material inlet so that circulating materials can flow out from the circulating material outlet, be heated by the external heater, and flow back to the furnace body from the circulating material inlet; a heat source of the external heater is microwave, high temperature microwave plasma, laser, plasma arc, solar energy, or a combination thereof.

In a class of this embodiment, the external heater is integrated with the furnace body, and a heat source of the external heater is microwave, high temperature microwave plasma, laser, plasma arc, solar energy, high temperature bed material from a circulating fluidized bed (CFB) boiler, or a combination thereof.

In a class of this embodiment, the microwave plasma generators have large electrode gap, strong plasma activity, and wide volume range; a microwave power source of the microwave plasma generators has a basic frequency of 2.45 GHz, and a power of a single microwave plasma generator is within 200 kW.

The invention also provides a method of gasification using the externally heated microwave plasma gasifier. The method employs external thermal energy to gasify biomass fuel, and the method comprises the following steps:

1) introducing feedstock comprising biomass fuel and solid waste into the furnace body via the feeder, gasifying and pyrolyzing the feedstock in the high temperature bed zone to yield syngas comprising a large amount of CO, $H_2$, $CO_2$ and a small amount of $CH_4$ and tar;

2) allowing the syngas to flow upward to the clearance zone of the gasifier, starting up the microwave plasma generators to generate high temperature plasma oxidizers having high activity, high degree of ionization in nonequilibrium state, so that the syngas mixes with the plasma oxidizers and cracks, spraying vapor into the furnace body from the upper nozzle, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body;

3) spraying high temperature $CO_2$ and vapor form the lower nozzle into the furnace body so that carbon residues in the bed zone are reduced or oxidized;

4) transporting unreacted carbon residues and bed materials to the external heater via the circulating material outlet, where the carbon residues are combusted, the bed materials are heated and separated from slags, and discharging the slags from the slag outlet;

5) returning the separated bed materials to the furnace body from the circulating material inlet, the bed materials flowing downward, exchanging heat with high temperature syngas flowing reversely, and releasing thermal energy in the bed zone to have a temperature of between 600 and 1000° C.; transporting the cooled bed materials to the external heater for heating again, and repeating the circulation for several times as needed; a temperature of the circulating material outlet being between 750 and 1200° C., and the temperature of the heated bed materials being higher than that in the bed zone; and 6) monitoring by the monitoring unit the temperature and components of the syngas, regulating $CO_2$ flow rate, vapor flow rate, and microwave power to ensure the operation of the gasification.

In a class of this embodiment, in step 2), a retention time of the syngas staying at the plasma atmosphere in the clearance zone is between 3 and 6 seconds.

In a class of this embodiment, in step 2), a retention time of the syngas staying at the plasma atmosphere in the clearance zone is between 4 and 6 seconds.

In a class of this embodiment, in steps 3)-5), a reaction temperature in the bed zone of the gasifier is controlled at between 600 and 850° C.

The invention further provides a method of gasification using the externally heated microwave plasma gasifier.

The method employs external thermal energy to gasify biomass fuel, and the method comprises the following steps:

1) introducing feedstock comprising biomass fuel and solid waste into the furnace body via the feeder, gasifying and pyrolyzing the feedstock in the high temperature bed zone to yield syngas comprising a large amount of CO, $H_2$, $CO_2$ and a small amount of $CH_4$ and tar;

2) allowing the syngas to flow upward to the clearance zone of the gasifier, starting up the microwave plasma generators to generate high temperature plasma oxidizers having high activity, high degree of ionization in nonequilibrium state, so that the syngas mixes with the plasma oxidizers and cracks, spraying vapor into the furnace body from the upper nozzle, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body;

3) heating the gasifier by the external heater disposed at the bottom of the gasifier to maintain a temperature in the bed zone to be between 600 and 1000° C., and a temperature in clearance zone to be between 750 and 1600° C.; and 4) monitoring by the monitoring unit the temperature and components of the syngas, regulating $CO_2$ flow rate, vapor flow rate, and microwave power to ensure the operation of the gasification, and controlling a temperature of the syngas outlet to be between 750 and 1200° C.

Advantages according to embodiments of the invention are summarized as follows.

1. The gasifier employs an external heater to supply thermal energy, so the chemical energy of biomass can be more used for the generation of active components, even without the addition of oxidizers, and the volume percentage of the active components (CO+$H_2$) in the syngas can exceed 90%.

2. The microwave plasma generator disposed in the clearance zone of the gasifier promotes the non-equilibrium cleavage reaction of tar, little ever no tar is produced, thereby producing good economic efficiency.

3. The gasifier has no specific requirement on the particle size of biomass fuel, primary crushing can meet the requirement of particle size, and thus the production costs are low, with good economic efficiency.

4. The external heat source can be any kind of energy sources, for example, industrial waste heat, which is conducive to the comprehensive utilization of energy sources.

BRIEF DESCRIPTION OF THE DRAWINGS

The invention is described hereinbelow with reference to accompanying drawings, in which.

Figure 1:
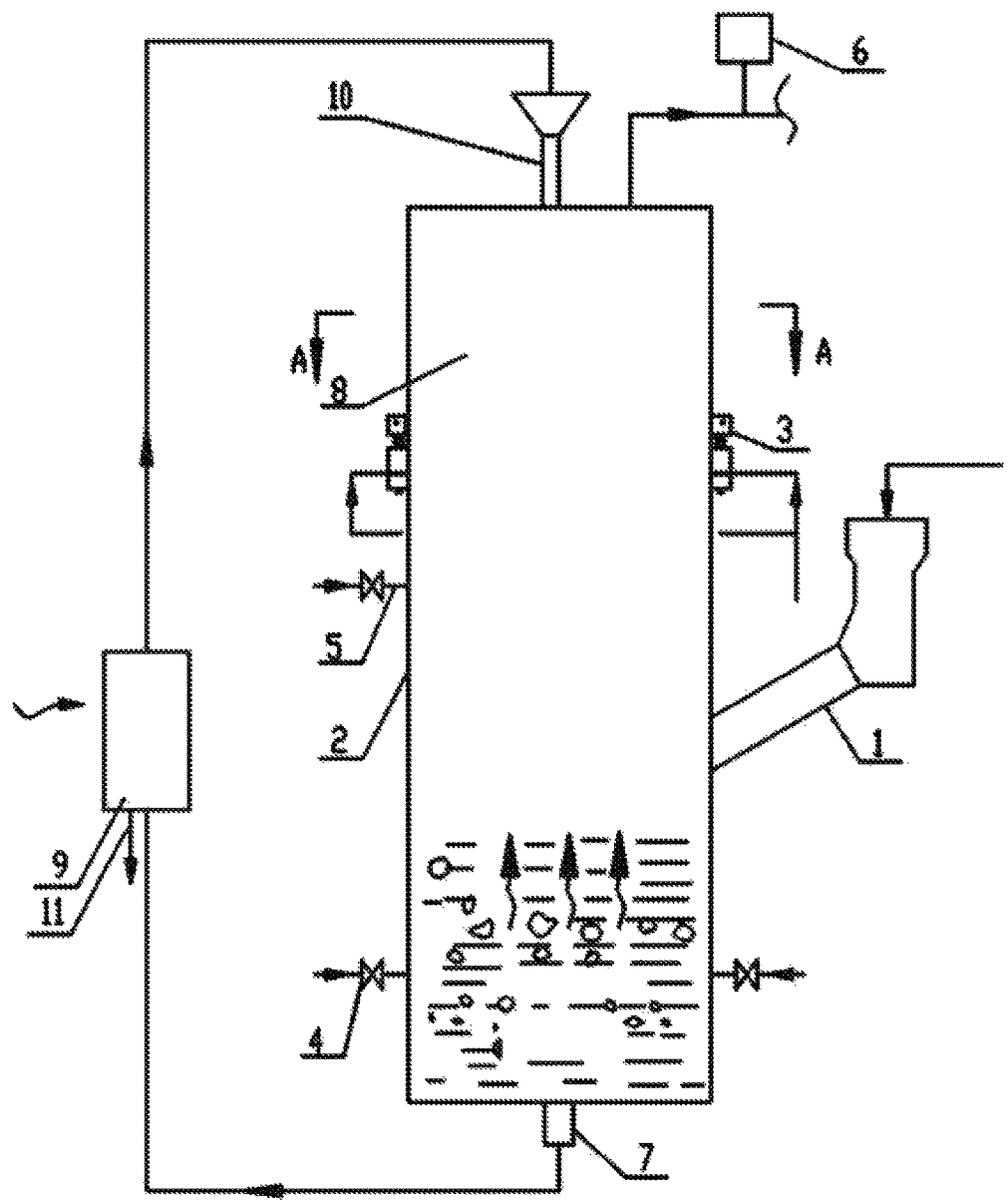
FIG. 1 shows a schematic diagram of an externally heated microwave plasma gasifier and a flow chart of a gasification method of using the same according to one embodiment of the invention.
Figure 2:
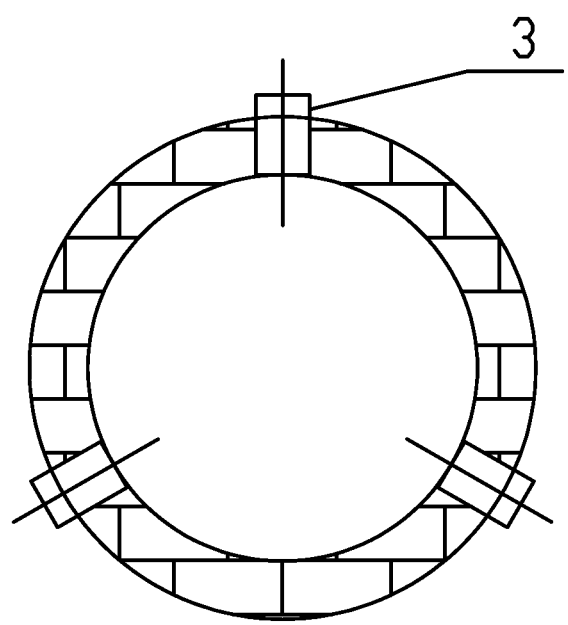
FIG. 2 is a sectional view taken from Line A-A of FIG. 1.

In the drawings, the following reference numbers are used: 1. Feeder; 2. Furnace body; 3. Microwave plasma generator; 4. Lower nozzle; 5. Upper nozzle; 6. Monitoring unit; 7. Circulating material outlet; 8. Clearance zone of gasifier; 9. External heater; 10. Circulating material inlet; 11. Slag outlet.

DETAILED DESCRIPTION OF THE EMBODIMENTS

Example 1

An externally heated microwave plasma gasifier comprises a vertically disposed furnace body 2, a feeder 1 communicating with the furnace body 2, a microwave plasma generator 3, an external heater 9 configured to supply external thermal energy for the gasifier, and a monitoring unit 6. The furnace body 2 comprises an upper nozzle 5 for spraying vapor, a lower nozzle 4 for spraying $CO_2$/vapor, a syngas outlet disposed at a top of the furnace body. The upper nozzle 5 for spraying vapor is disposed in a clearance zone of the furnace body, and the lower nozzle 4 for spraying $CO_2$/vapor is disposed in a bed zone of the furnace body. The monitoring unit 6 is disposed close to the syngas outlet. A circulating material outlet 7 is disposed at a bottom of the furnace body and a circulating material inlet 10 is disposed at a top of the furnace body. The external heater 9 is separated from the furnace body 2 and is disposed between the circulating material outlet 7 and the circulating material inlet 10 so that circulating materials can flow out from the circulating material outlet 7, be heated by the external heater 9, and flow back to the furnace body from the circulating material inlet 10. The external heater comprises a slag outlet 11 for discharging slags.

Optionally, the circulating material outlet 7 and the circulating material inlet 10 are both disposed at a sidewall of the furnace body 2.

The feeder 1 is disposed in the middle part of the furnace body 2. One or two layers of microwave plasma generators 3 are disposed above the upper nozzle in the clearance zone 8 of the gasifier; each layer of the microwave plasma generators comprises three or four working gas inlets, and plasma flow is sprayed into the clearance zone 8 of the gasifier horizontally/tangentially. The microwave plasma generators have large electrode gap, strong plasma activity, and wide volume range; a microwave power source of the microwave plasma generators has a basic frequency of 2.45 GHz, and a power of a single microwave plasma generator is within 200 kW.

The heat source of the external heater 9 is microwave, high temperature microwave plasma, laser, plasma arc, solar energy, or industrial waste heat. The external heater 9 heats the bed materials to have high temperature for circulating. In the external heater 9, the fixed carbon materials can be combusted completely, and the bed materials and biomass slags can be separated completely.

A method of gasification using the externally heated microwave plasma gasifier, comprises the following steps:

1) introducing feedstock comprising biomass fuel and solid waste into the furnace body 2 via the feeder 1, gasifying and pyrolyzing the feedstock in the high temperature bed zone to yield syngas comprising a large amount of CO, $H_2$, $CO_2$ and a small amount of $CH_4$ and tar;

2) allowing the syngas to flow upward to the clearance zone 8 of the gasifier, starting up the microwave plasma generators to generate high temperature plasma oxidizers having high activity, high degree of ionization in nonequilibrium state, so that the syngas mixes with the plasma oxidizers and cracks, spraying vapor into the furnace body from the upper nozzle 5, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body, the syngas product comprising little even no tar;

3) spraying high temperature $CO_2$ and vapor form the lower nozzle 4 into the furnace body when the fixed carbon content is high and the bed zone has plenty of heat (that is, the external thermal energy supplied by the external heater 9 is sufficient), so that carbon residues in the bed zone are reduced or oxidized to yield more $CO_2$ or $H_2$ in the syngas; transporting unreacted carbon residues and bed materials to the external heater 9 via the circulating material outlet, where the carbon residues are combusted, the bed materials are heated and separated from slags, and discharging the slags from the slag outlet 11; returning the separated bed materials to the furnace body from the circulating material inlet, the bed materials flowing downward, exchanging heat with high temperature syngas flowing reversely so that the syngas is heated to have a temperature of between 1000 and 1200° C., and releasing thermal energy in the bed zone to have a temperature of between 600 and 1000° C.; transporting the cooled bed materials to the external heater 9 for heating again, and repeating the circulation for several times as needed; a temperature of the circulating material outlet 7 being between 750 and 1200° C.; and 4) monitoring by the monitoring unit the temperature and components of the syngas, regulating $CO_2$ flow rate, vapor flow rate, and microwave power to ensure the operation of the gasification, and controlling a temperature of the syngas outlet to be between 800 and 1200° C.

In step 2), the retention time of the syngas staying at the plasma atmosphere in the clearance zone is between 3 and 6 seconds, particularly between 4 and 6 seconds.

In step 3), the reaction temperature in the bed zone of the gasifier is controlled at between 600 and 850° C.

In step 3), the sprayed working gas is high temperature $CO_2$ or high temperature vapor, which is determined by the requirement for the components of the syngas.

The bed materials of the gasifier are composed of high-temperature resistant materials having strong thermal storage capacity. The biomass fuel heated by the external heater enters the gasifier and exchanges heat with high temperature syngas flowing reversely, and then flows downward to the high temperature bed zone where the biomass fuel is heated quickly. The biomass fuel has high oxygen content, and low fixed carbon content. Thus, in the bed zone, the biomass fuel is pyrolyzed to yield volatile matters and semi-coke. To maintain the high temperature in the pyrolysis zone, appropriate high temperature vapor/$CO_2$ is sprayed into the gasifier, so that the volatile matters are cracked under the high temperature to yield a large amount of active components (CO+$H_2$) and a small amount of tar vapor which flows upward to the clearance zone of the gasifier. The unreacted carbon residues and bed materials are transported to the external heater, where the carbon residues and bed materials are heated, and oxidizers are introduced to facilitate the complete combustion of the carbon residues in the mixture. The bed materials are separated from slags. The heated bed materials are transported to the furnace body from the top or the side thereof, flow downward to exchange heat with high temperature syngas flowing reversely to reduce the temperature of the syngas and increase the temperature of the bed materials. The high temperature bed materials fall to the bed zone to supply thermal energy for the newly-introduced biomass fuel and maintain the temperature for the cracking reaction. After heat exchange, the cooled bed materials are transported to the external heater for next heating and separating. The above steps are repeated for several times as needed. The circulation factor of the bed materials is determined by the characteristics of the fuel.

The syngas comprising a small amount of tar vapor and fly ash flows upward to the clearance zone of the gasifier where the microwave plasma generator is disposed. In the presence of plasma oxidizer having high activity, high degree of ionization in nonequilibrium state, the tar vapor in the high temperature syngas is cracked quickly for the complete removal of the tar. The syngas in the syngas outlet is cooled and purified to achieve the level of direct usage.

Example 2

The gasifier in this example is basically the same as that in Example 1 except that (A) the external heater 9 is not separated from the furnace body 2 but is integrated with the furnace body 2, and the circulating material outlet disposed at the bottom of the furnace body and the circulating material inlet disposed at a top of the furnace body are removed. Thus, the external heat source can be introduced into the gasifier, the material circulating process is omitted, thereby resulting a simple system, high operability and high efficiency.

(B) A heat source of the external heater is microwave, high temperature microwave plasma, laser, plasma arc, solar energy, high temperature bed material from a circulating fluidized bed (CFB) boiler, or a combination thereof.

A method of gasification using the externally heated microwave plasma gasifier comprises the following steps:

1) introducing feedstock comprising biomass fuel and solid waste into the furnace body via the feeder, gasifying and pyrolyzing the feedstock in the high temperature bed zone to yield syngas comprising a large amount of CO, $H_2$, $CO_2$ and a small amount of $CH_4$ and tar;

2) allowing the syngas to flow upward to the clearance zone of the gasifier, starting up the microwave plasma generators to generate high temperature plasma oxidizers having high activity, high degree of ionization in nonequilibrium state, so that the syngas mixes with the plasma oxidizers and cracks, spraying vapor into the furnace body from the upper nozzle, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body;

3) heating the gasifier by the external heater disposed at the bottom to maintain a temperature in the bed zone to be between 600 and 1000° C., and a temperature in clearance zone to be between 750 and 1600° C.; and 4) monitoring by the monitoring unit the temperature and components of the syngas, regulating $CO_2$ flow rate, vapor flow rate, and microwave power to ensure the operation of the gasification, and controlling a temperature of the syngas outlet to be between 750 and 1200° C.

To achieve the optimal working conditions and satisfy the overall performance requirement of the gasification, the key is to control the temperature of the bed zone, to control the bed material supply, and to regulate the $CO_2$ flow rate, vapor flow rate, and microwave power. The monitoring unit disposed close to the syngas outlet can monitor the above parameters in real time, thereby controlling the gasification process by chain and by full automation and maintaining the operation stability of the gasifier.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A gasifier, comprising:
   a vertically disposed furnace body, the furnace body comprising an upper nozzle for spraying vapor, a lower nozzle for spraying $CO_2$/vapor, and a syngas outlet disposed at the top of the furnace body, the lower nozzle comprising a nozzle opening;
   bed materials;
   a feeder, the feeder being disposed in the middle part of the furnace body and communicating with the furnace body;
   one or two layers of microwave plasma generators;
   an external heater configured to supply external thermal energy for the gasifier;
   a circulating material outlet;
   a circulating material inlet; and
   a monitoring unit;
   wherein
   the upper nozzle is disposed in a clearance zone of the furnace body;
   the lower nozzle and the bed materials are disposed at the bottom of the furnace body;
   the nozzle opening is disposed toward the bed materials;
   the monitoring unit is disposed in a close proximity to the syngas outlet;
   the one or two layers of microwave plasma generators are disposed above the upper nozzle in the clearance zone of the gasifier, each layer of the microwave plasma generators comprises three or four working gas inlets, the microwave plasma generators are adapted to spray plasma into the clearance zone of the gasifier horizontally/tangentially;
   the external heater is separated from the furnace body;
   the circulating material outlet is disposed at the bottom of the furnace body and the circulating material inlet is disposed at the top of the furnace body, or the circulating material outlet and the circulating material inlet are both disposed at a sidewall of the furnace body;
   the external heater is disposed between the circulating material outlet and the circulating material inlet;

when in use, circulating materials are transferred through the circulating material outlet to the external heater and then back to the furnace body via the circulating material inlet; and
   the external heater comprises a slag outlet for discharging slags.

2. The gasifier of claim 1, wherein
   a heat source of the external heater is microwave, microwave plasma, laser, plasma arc, solar energy, or a combination thereof.

3. The gasifier of claim 1, wherein a microwave power source of the microwave plasma generators has a basic frequency of 2.45 GHz, and a power of a single microwave plasma generator is less than or equal to 200 kW.

4. The gasifier of claim 2, wherein a microwave power source of the microwave plasma generators has a basic frequency of 2.45 GHz, and a power of a single microwave plasma generator is less than or equal to 200 kW.

5. A method of gasification using a gasifier of claim 1, the method employing external thermal energy to gasify biomass fuel, and the method comprising the following steps:
   1) introducing feedstock comprising biomass fuel and solid waste into the furnace body via the feeder, gasifying and pyrolyzing the feedstock in the bed zone to yield syngas comprising a large amount of CO, $H_2$, $CO_2$ and a small amount of $CH_4$ and tar;
   2) allowing the syngas to flow upward to the clearance zone of the gasifier, starting up the microwave plasma generators to generate plasma oxidizers having high activity, high degree of ionization in nonequilibrium state, so that the syngas mixes with the plasma oxidizers and cracks, spraying vapor into the furnace body from the upper nozzle, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body;
   3) spraying heated $CO_2$ and vapor from the lower nozzle into the furnace body so that carbon residues in the bed zone are reduced or oxidized;
   4) transporting unreacted carbon residues and bed materials to the external heater via the circulating material outlet, where the carbon residues are combusted, the bed materials are heated and separated from slags, and discharging the slags from the slag outlet;
   5) returning the separated bed materials to the furnace body from the circulating material inlet, the bed materials flowing downward, exchanging heat with syngas flowing reversely, and releasing thermal energy in the bed zone to have a temperature of between 600 and 1000° C.; transporting the cooled bed materials to the external heater for heating again, and repeating the circulation for several times as needed; a temperature of the circulating material outlet being between 750 and 1200° C., and the temperature of the heated bed materials being higher than that in the bed zone; and
   6) monitoring by the monitoring unit the temperature and components of the syngas, regulating $CO_2$ flow rate, vapor flow rate, and microwave power to ensure the operation of the gasification.

6. The method of claim 5, wherein in step 2), a retention time of the syngas staying at the plasma atmosphere in the clearance zone is between 3 and 6 seconds.

7. The method of claim 6, wherein in step 2), a retention time of the syngas staying at the plasma atmosphere in the clearance zone is between 4 and 6 seconds.

8. The method of claim 7, wherein a reaction temperature in the bed zone of the gasifier is controlled at between 600 and 850° C.

9. A method of gasification using a gasifier of claim 1, the method employing external thermal energy to gasify biomass fuel, and the method comprising the following steps:
 1) introducing feedstock comprising biomass fuel and solid waste into the furnace body via the feeder, gasifying and pyrolyzing the feedstock in the bed zone to yield syngas comprising a large amount of CO, $H_2$, $CO_2$ and a small amount of $CH_4$ and tar;
 2) allowing the syngas to flow upward to the clearance zone of the gasifier, starting up the microwave plasma generators to generate plasma oxidizers having high activity, high degree of ionization in nonequilibrium state, so that the syngas mixes with the plasma oxidizers and cracks, spraying vapor into the furnace body from the upper nozzle, controlling the clearance zone at a temperature of between 1000 and 1200° C., regulating a flow rate of the plasma oxidizers to ensure the syngas to stay at a plasma atmosphere for between 3 and 10 seconds, agitating the plasma flow to strength the heat and mass transfer, and collecting a final syngas product from the syngas outlet disposed at the top of the furnace body;
 3) heating the gasifier by the external heater disposed at the bottom of the gasifier to maintain a temperature in the bed zone to be between 600 and 1000° C., and a temperature in clearance zone to be between 750 and 1600° C.; and
 4) monitoring by the monitoring unit the temperature and components of the syngas, regulating $CO_2$ flow rate, vapor flow rate, and microwave power to ensure the operation of the gasification, and controlling a temperature of the syngas outlet to be between 750 and 1200° C.

* * * * *